Patented Jan. 12, 1932

1,840,983

UNITED STATES PATENT OFFICE

SHERMAN I. STRICKHOUSER, OF PASSAIC, NEW JERSEY, ASSIGNOR TO THE NAUGATUCK CHEMICAL COMPANY, OF NAUGATUCK, CONNECTICUT, A CORPORATION OF CONNECTICUT

TREATMENT OF RUBBER AND PRODUCT THEREOF

No Drawing.   Application filed November 26, 1928.   Serial No. 322,106.

This invention relates to the treatment of rubber and similar vulcanizable materials, whereby the rubber will be resistant to checking and cracking. It further relates to the product of such treatment.

An object of this invention is to provide a process for retarding the checking or cracking of vulcanized rubber, more particularly when exposed to sunlight while under tension. A further object is to provide a rubber having the property of resisting checking or cracking, more particularly when exposed to sunlight while under tension.

According to the present invention, compounds containing the group

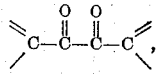

that is alpha diketones, among which are such as benzil, phenanthraquinone, and furil,—are incorporated into rubber, and the rubber vulcanized, or the compound may be incorporated into the rubber after vulcanization as by dipping, spraying or painting the vulcanized rubber with a suitable solution of the compound.

When vulcanized rubber under tension is exposed to sunlight, checks and cracks develop on the surface in a short time, the time varying from a few hours to a few days, depending on the intensity of the sunlight, but by incorporating the above mentioned compound or compounds into the rubber the time of cracking is decidedly delayed and the depth of cracking substantially lessened.

The best results have been obtained with pure gum stocks and inner tube stocks. For instance a bent sample of stock prepared and vulcanized, as follows, does not develop cracks even after more than one months exposure to sunlight:

.5 part of benzil is mixed on the rolls in the usual manner with 100 parts pale crepe rubber, 10 parts of zinc oxide, 3 parts of sulphur, and .3 part of heptaldehyde aniline condensation product diluted with spindle oil. This mix is then vulcanized for 60 min. in a mold under 40 lbs. steam pressure. A vulcanized sample prepared in the same manner from a similar mix but which does not contain any benzil, when bent and exposed to sunlight, in contrast to the above mentioned behavior of the rubber containing the benzil, develops cracks in 4–48 hrs.

Of course the invention is not limited to the above compounding ingredients, accelerator, method of vulcanization, or to the quantity of chemicals mentioned in the example,—and modifications will suggest themselves without departing from the principle of the invention.

The term "rubber" as claimed is to be interpreted in a broad sense to cover latex (natural or artificial), synthetic rubber, and such as gutta percha and balata.

Having thus described my invention, what I claim and desire to protect by Letters Patent is:

1. The process of retarding the checking or cracking of rubber materials which comprises treating rubber with an alpha diketone selected from the group consisting of benzil, phenanthraquinone, furil.

2. The process of retarding the checking or cracking of rubber materials which comprises treating rubber with benzil.

3. The process of retarding the checking or cracking of rubber materials which comprises treating rubber with an alpha diketone selected from the group consisting of benzil, phenanthraquinone, furil and then vulcanizing.

4. The process of retarding the checking or cracking of rubber materials which comprises treating rubber with benzil, and then vulcanizing.

5. The process of retarding the checking or cracking of rubber material which comprises treating rubber stock containing a vulcanizing agent and an accelerator with an alpha diketone selected from the group consisting of benzil, phenanthraquinone, furil.

6. The process of retarding the checking or cracking of rubber material which comprises treating rubber stock containing a vulcanizing agent and an accelerator with benzil.

7. The process of retarding the checking or cracking of rubber material which comprises treating rubber stock containing a vulcanizing agent and an accelerator with an alpha diketone selected from the group consisting of benzil, phenanthraquinone, furil, and then vulcanizing.

8. The process of retarding the checking or cracking of rubber material which comprises treating rubber stock containing a vulcanizing agent and an accelerator with benzil, and then vulcanizing.

9. A process of retarding the checking or cracking of rubber material which comprises treating a rubber stock containing sulphur, zinc oxide, and an accelerator with benzil, and then vulcanizing the stock.

10. A rubber product resistant to checking or cracking comprising rubber treated with an aromatic alpha diketone selected from the group consisting of benzil, phenanthraquinone, furil.

11. A vulcanized rubber product resistant to checking or cracking comprising rubber treated with an aromatic alpha diketone selected from the group consisting of benzil, phenanthraquinone, furil.

12. A vulcanized rubber product resistant to checking or cracking comprising rubber treated with benzil.

Signed at Passaic, county of Passaic, State of New Jersey, this 21 day of November, 1928.

SHERMAN I. STRICKHOUSER.